No. 683,259. Patented Sept. 24, 1901.
C. G. & L. P. DUREL.
COFFEE OR TEA MAKING APPARATUS.
(Application filed Oct. 6, 1900.)
(No Model.)
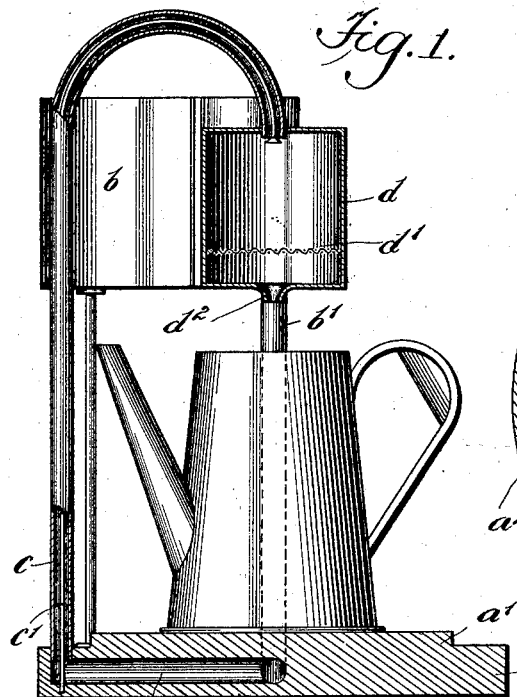
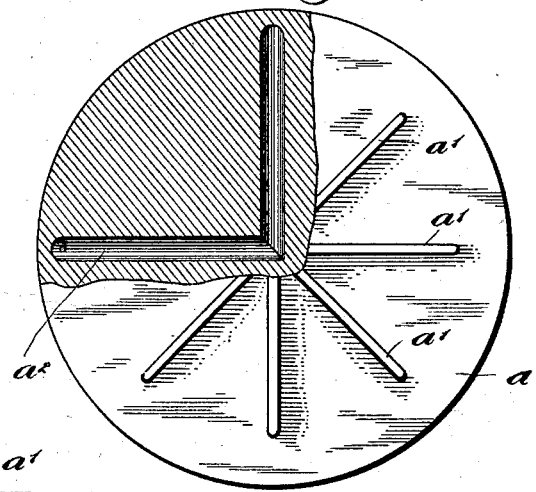
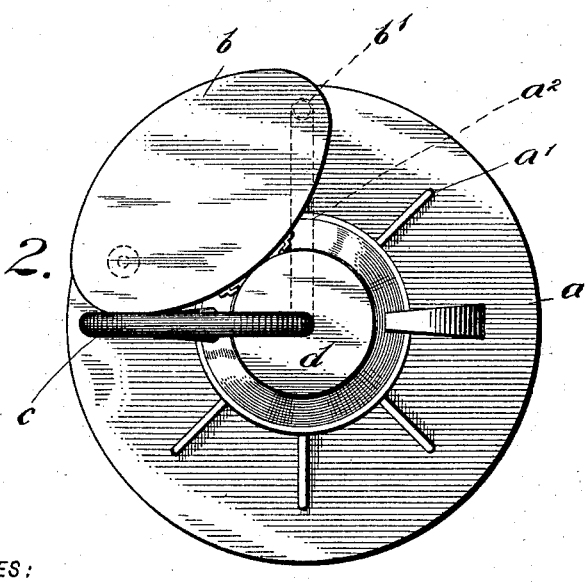
WITNESSES:
INVENTORS
Charles G. Durel
Louis P. Durel
BY
ATTORNEYS

UNITED STATES PATENT OFFICE.

CHARLES GUSTAVE DUREL AND LOUIS PIERRE DUREL, OF NEW ORLEANS, LOUISIANA.

COFFEE OR TEA MAKING APPARATUS.

SPECIFICATION forming part of Letters Patent No. 683,259, dated September 24, 1901.

Application filed October 6, 1900. Serial No. 32,222. (No model.)

*To all whom it may concern:*

Be it known that we, CHARLES GUSTAVE DUREL and LOUIS PIERRE DUREL, citizens of the United States, and residents of New Orleans, in the parish of Orleans and State of Louisiana, have invented a new and Improved Coffee or Tea Making Apparatus, of which the following is a full, clear, and exact description.

This invention relates to an apparatus for brewing beverages from tea, coffee, and from other herbs of like character.

The invention embodies a water-reservoir having communication with a base in the form of a vessel in which the water is heated and from which passes a pipe to conduct the boiling water upward and through a can in which the herbs are placed, so as to subject them to the action of the boiling water.

This specification is the disclosure of one form of our invention, while the claims define the actual scope thereof.

Reference is to be had to the accompanying drawings, forming a part of this specification, in which similar characters of reference indicate corresponding parts in all the views.

Figure 1 is a vertical section of the invention. Fig. 2 is a plan view thereof; and Fig. 3 is a plan view of the base, with parts broken away to show the passage therein which forms the space in which the water is contained for boiling.

$a$ represents a base, which is here shown as circular in form and which is preferably constructed of cast metal. On top of this base are formed a number of ridges $a'$, adapted to sustain a coffee or tea pot, as shown in Fig. 1, and within the base is formed an angular passage $a^2$, which provides a space in which the water is passed to subject it to the necessary heat for boiling it. The base $a$ is adapted to be placed on a stove or over a fire, so as to heat it thoroughly, and thus the water in the space $a^2$ is boiled. A water-reservoir $b$ is suitably sustained on the base and has a tube $b'$ passing therefrom downward to one end of the passage $a^2$. From the other end of the passage $a^2$ a tube $c$ passes upward to a can $d$, in which the coffee or tea is placed, the can being provided with a sieve $d'$ near the bottom thereof and with an outlet $d^2$, adapted to permit the brew to drip down into the tea or coffee pot, which is placed below it, as shown in Fig. 1. Within the tube $c$ is placed a wire or rod $c'$, which serves to reduce the capacity of the tube. As here shown, this tube is of the same diameter as the tube $b'$, but its capacity is less, owing to the presence of the rod $c'$ within the tube $c$. Obviously the same result could be obtained by making the tube $c$ smaller.

In the operation of the invention the reservoir $b$ is filled with water and it is permitted to flow down the tube $b'$ into the passage $a^2$, from which it passes upward to the level of the water within the reservoir $b$, it being shown in Fig. 1 that the tube $c$ passes up above the top of the reservoir. As the water in the passage $a^2$ boils it will pass upward through the tube $c$ and down into the can $d$, where the boiling water is sprayed upon the coffee or tea and the beverage is therein brewed.

It is obvious that this device may be used not only for making beverages of the sort described, but it may also be used for heating water by removing the can $d$ and drawing the heated water directly from the outlet of the tube $c$.

Having thus described our invention, we claim as new and desire to secure by Letters Patent—

1. The combination of a flat base capable of sustaining on its upper side a culinary vessel and provided with an interior chamber, a water-reservoir sustained on the base above the same, a pipe passing from said reservoir downward to and communicating with said chamber in the base, and a delivery-pipe passing upward from the base and communicating with the chamber therein, the delivery-pipe having its discharge end turned downward, for the purpose specified.

2. The combination of a flat base capable of sustaining on its upper side a culinary vessel and provided with an interior chamber, a water-reservoir sustained on the base above the same, a pipe passing from said reservoir downward to and communicating with the chamber in the base, and a delivery-pipe of less capacity than the first-named pipe, the delivery-pipe passing upward from the base and communicating with the chamber therein, the upper end of the delivery-pipe being turned downward to discharge the water into a vessel on the base.

In testimony whereof we have signed our names to this specification in the presence of two subscribing witnesses.

CHARLES GUSTAVE DUREL.
  LOUIS PIERRE DUREL.

Witnesses:
 ETHELRED M. STAFFORD,
 FRANCIS A. LAMBERT.